Jan. 28, 1930.  E. R. SNOOK  1,745,281
SHOCK ABSORBER
Filed Feb. 27, 1925    2 Sheets-Sheet 1
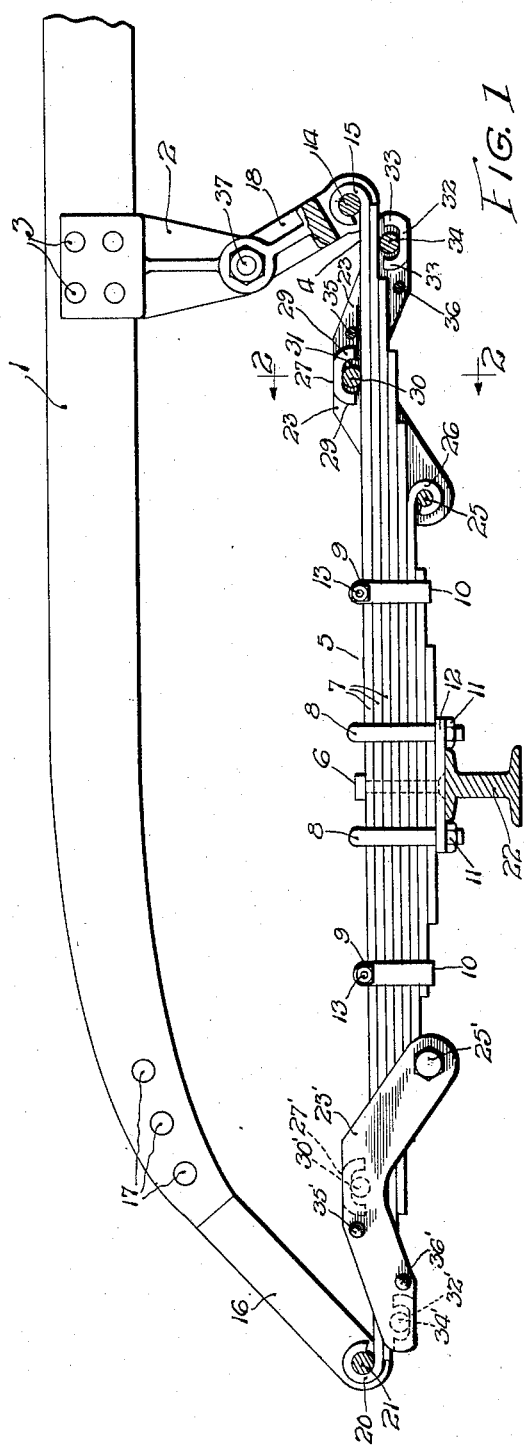
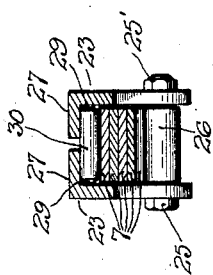
INVENTOR:
Earnest R. Snook
By Nissen & Crane
ATTYS.

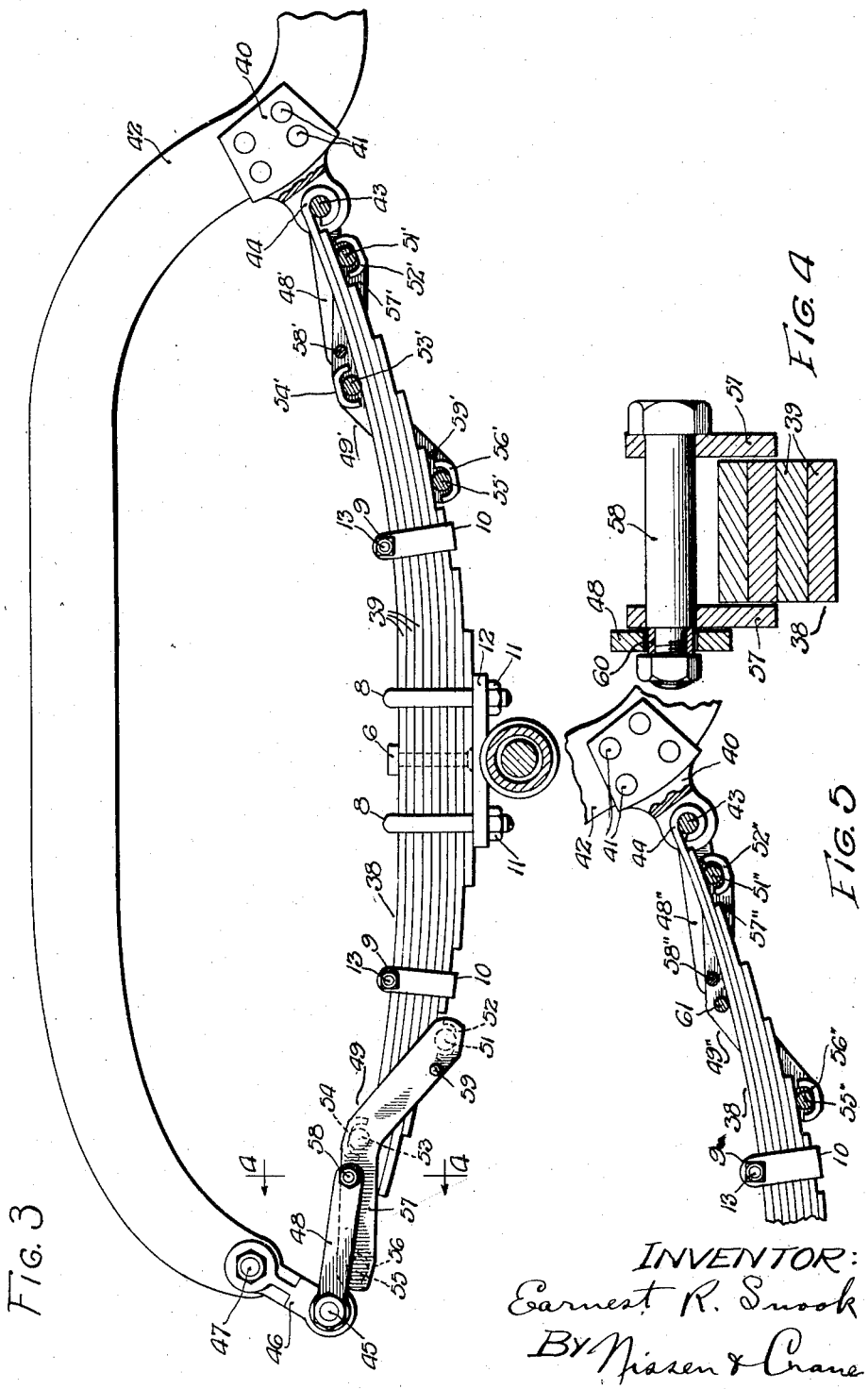

Patented Jan. 28, 1930

1,745,281

UNITED STATES PATENT OFFICE

EARNEST R. SNOOK, OF DAVENPORT, IOWA, ASSIGNOR TO STARKWEATHER-SNOOK CORPORATION, OF MOLINE, ILLINOIS, A CORPORATION OF IOWA

SHOCK ABSORBER

Application filed February 27, 1925. Serial No. 11,931.

This invention relates to a shock absorber adapted to cooperate with vehicle springs and has for one of its objects the provision of a simple and improved device of this character.

Another object of the invention is the provision of shock absorbing means that can be easily and quickly applied to the springs of a vehicle.

A still further object of the invention is the provision of means for changing the effective length of vehicle springs so as to effect changes in the flexure thereof.

Other objects will appear hereinafter, the novel features and combinations being set forth in the appended claims.

In the drawings—

Fig. 1 is a side view of a front spring equipped with a shock absorber embodying my invention;

Fig. 2 is a sectional view taken on line 2—2 of Fig. 1 looking in the direction of the arrows;

Fig. 3 is a side view of a rear spring equipped with a shock absorber embodying my invention;

Fig. 4 is a sectional view taken on line 4—4 of Fig. 3 looking in the direction of the arrows; and Fig. 5 is a side view of a part of a vehicle spring equipped with a modified form of my invention.

Referring more particularly to Fig. 1 of the drawings, it will be seen that a frame 1 of a vehicle is shown having a bracket 2 secured thereto by means of bolts or rivets 3. In the structure illustrated in Fig. 1 the bracket 2 is attached at a desirable point near the forward end of the vehicle so as to be in a position to support the rear end 4 of a front spring 5. The front spring 5 comprises a plurality of superimposed spring leaves 7 held in superimposed position by a stud bolt 6, a pair of inverted U-shaped brackets 8, 8 and upright U-shaped brackets 10, 10, there being a plate 12 positioned adjacent the under side of the lowermost leaf 7 to cooperate with the inverted U-shaped brackets 8, 8 and with the stud bolt 6 in retaining the leaves 7 in a fixed position. The plate 12 is provided with a threaded opening in the central portion thereof to accommodate the stud bolt. Each end of the plate 12 is provided with two openings or holes to receive the threaded ends of the inverted U-shaped brackets or braces 8, 8, there being a nut 11 screwthreaded onto each of the four ends of the braces and against the lowermost surface of the plate. The upright U-shaped brackets or braces 9, 9 are provided near their upper ends with bolts 13, 13 which when tightened cause the braces 9, 9 to exert a clamping force on the spring leaves 7. As shown in Fig. 1, the plate 12 rests upon the axle 22 of the vehicle.

The rear end 4 of the uppermost leaf member of the spring 5 is disposed in a substantially closed loop 15 which is pivotally journaled on a stud bolt 14 on the lower end of a link member 18. The upper end of the link member 18 is journaled on a stud or bolt 37 which is secured to the lowermost portion of the bracket 2. The front end of the uppermost leaf of the spring 5 is likewise disposed in a substantially closed loop 20 which is journaled on a stud bolt 21 on the end of the frame extension 16. The frame extension 16 is secured to the frame part 1 by bolts or rivets 17.

Spring stabilizing devices are shown in Fig. 1 mounted on each end of the spring 5. It should be understood that the spring stabilizing devices may be mounted in a similar manner on springs of different construction than that shown in the drawings, the particular illustration being used to show the method of operation of the stabilizer. Each stabilizer comprises parallel plate members 23, 23, one positioned on each side of the leaf spring members 7 and secured together by bolts 35 and 36. The lowermost ends of the angle plates 23, 23 are journaled on a short shaft or bolt 25 which passes through a loop 26 at the extreme end of one of the leaf members 7. After the nut is put in place the end 25' shown in Fig. 2 may be peaned over.

In the illustration shown in Fig. 1 the third leaf from the bottom of the spring 5 is disposed downwardly in a substantially closed loop 26 similar to the loop 15 on the uppermost leaf member. It should be understood that the angle plates 23 may be journaled at the end of the most conveniently located leaf member; the third leaf from the bottom has been chosen for illustrative purposes. The positions of the lowermost ends of the angle plates 23, 23 determine the rigidity of the stabilizing device and thus the device may be attached in such a manner as to correspond to the weight of the particular vehicle upon which it is mounted. It should also be understood that the angle plates 23, 23 are free to rotate relatively to the loop 26.

As shown in Figs. 1 and 2, inwardly prjoecting flanges 27 are made integral respectively with the angle plates 23, 23 and are located at the uppermost portions of said plates. Ears 29, 29 are disposed downwardly along both lateral edges of the flanges 27, 27 to a position slightly above the upper surface of the top spring leaf member to form pockets. In Figs. 1 and 2 it will be seen that the angle plate 23, the flange 27 and the downwardly disposed ears 29, 29 form a partial enclosure 31 or pocket for a roller 30. The roller 30 rests upon the upper surface of the top spring leaf and has a slight freedom of lateral movement within the enclosures or pockets 31. A similar pair of enclosures or pockets at the extreme rear end of the angular plate members are provided by said angular plates 23, 23, ears 33, 33 and a flange 32. A roller 34 is substantially enclosed in said enclosure and is adapted to contact with the under side of one of the leaf springs. Bolts may be provided, as indicated at 35 and 36, to hold the plates 23 and the pockets 31 in proper positions. At the forward end of the spring 5 a stabilizer is connected to a leaf 7 and comprises the parts 23', 27', 30', 32', 34', 35' and 36'.

The operation of the stabilizing device will be best understood by tracing the movement of the several moving parts that would be set in motion if a vehicle equipped with the device were driven over rough roads. Assuming that a comparatively heavy vehicle body is supported by the frame 1, it will be seen that there is considerable weight upon the spring 5. When the vehicle wheels strike an irregularity in the road the weight of the body would be projected upwardly or downwardly realtive to the spring ends and thus cause flexion of the springs, the amount of flexion in the springs depending upon the strength of the springs and the force of the impact thereon. Flexible springs are required to absorb small amounts of impact or shock, whereas rigid, strong springs are required to absorb severe impact or shock. Thus it is necessary that a satisfactory vehicle spring be flexible enough to absorb slight amounts of impact and yet rigid enough to absorb severe shock and to prevent the framework from striking the axles.

The spring stabilizer disclosed is adapted to vary the effective length of the spring so as to permit a long flexible portion to be in operative engagement when only slight amounts of shock or impact are applied and to shorten the effective length so as to permit the rigid portions of said spring to be effective when large loads or amounts of impact are applied thereto.

In addition to the shock absorbing effect produced by changing the effective length of the spring, the stabilizer also compresses the leaves of the spring together with such a force as to prevent sliding of one leaf relative to another. This extreme friction, due to the increased force holding the leaves together, causes the entire spring to be rigid and to bend but slightly under large loads.

In Fig. 1 it will be seen that when a force is applied on the rear end of the spring, for example, the free end of the angular lever member 23 tends to move downwardly while the other end remains pivotally fixed at 25. The roller 30, resting against the upper-most leaf, tends to prevent the downward movement of the free end of the angular lever and thus exerts a force upon the spring which compresses the leaves thereof together. It should be understood that the force exerted by the roller 30 is applied at a point relatively close to the pivoted end or fulcrum of the lever and for this reason the force is greater in magnitude than the force applied upon the end of the spring.

When the axle falls due to the wheels passing into a hole or depression in the road, the above-described action is reversed. The fixed end of the lever moves downwardly and the free end thereof exerts an upward force which tends to separate the leaves of the spring and thus reduces the friction therebetween. This reduction in friction causes the spring to be less rigid and prevents excessive shock and vibration from being transmitted from the wheels to the frame and body of the vehicle.

By referring to Fig. 1 it will be seen that when the axle 22 is suddenly moved upwardly as by means of a hump on the road the effective length of the spring will be shortened and the spring will therefore be stiffened to more effectively resist such upward movement. Consequently the recoil of the body of the vehicle will be lessened accordingly. When the recoil does take place the effective length of the spring will also be shortened and by reason of this stiffening of the spring such downward recoil may be checked. The same is true when the wheels suddenly enter a depression on the road. The axle 22 will be permitted to move down freely by reason of the full length of the spring being in action. But when a downward following movement of the vehicle body begins by action on the ends of the spring the effective length of the spring will be shortened to check such downward movement and also the upward movement of the axle out of the depression on the road. Substantially the same operation takes place in connection with the construction shown in either Fig. 3 or Fig. 5. It will thus be seen that the stabilizer above described is an effective shock absorber.

Figs. 3 and 4 shown an embodiment of the stabilizer mounted on a rear spring of a vehicle. The spring 38, comprising leaf members 39, is curved upwardly at its end portions and is provided with U-shaped clamps 9, 9 and U-shaped braces 8, 8 similar to those duly described in connection with Figs. 1 and 2. The spring 38 is of the usual construction and is pivotally mounted at its forward end on a bracket 40 which is secured by bolts or rivets 41 to a frame 42. The uppermost leaf of the spring 38 is coiled downwardly at its forward end to form a substantially closed loop 44 which is journaled on a stud or bolt 43 secured to the bracket 40. The rear end of the spring 38 is journaled on a bolt 45 which passes through an opening in the lowermost end of a link 46, there being a loop similar to the loop 44 at the rear end of the uppermost leaf of the spring 38. A bolt 47 passes through an opening in the upper end of the link 46 and through an opening at the extreme rear end of the frame 42. The link 46 is pivotally connected by means of the bolt 47 to the extreme rear end of the frame 42.

A plate or lever 48 is pivotally connected to the bolt 45 and extends forward to the middle portion of a stabilizing device 49 where it is pivotally secured to said stabilizing device by means of a nut and bolt 58. The stabilizing device 49 is similar to the stabilizing device disclosed in Figs. 1 and 2 with the exception that it is in no way anchored directly to the spring 38; the plate 48 is provided to limit the amount of movement of the stabilizing device 48 with respect to the spring 38. The lower end of the stabilizer in place of being journaled on the end of one of the leaf members of the spring is provided with a roller 51 fitting in a pair of pockets 52.

The stabilizing device 49 comprises angle plates 57, 57 secured together by bolts 58 and 59 and provided with pockets 52, 54 and 56 adapted to receive and retain the rollers 51, 53 and 55, respectively. Rollers 51 and 55 engage the lower surface of the spring 38 and the roller 53 rests upon the upper surface thereof. The operation of the stabilizing device disclosed in Figs. 3 and 4 is similar to that of the device shown in Figs. 1 and 2 with the exception that movement of the stabilizer 49 is limited by the pivotally mounted plate or lever 48, whereas the stabilizer shown in Figs. 1 and 2 is secured at its lower end directly to the spring. At the forward end of the spring 38 the stabilizer 49' is connected by the link 48' to the bolt 43, and comprises the parts 51', 52', 53', 54', 55', 56', 57', 58' and 59'.

Fig. 5 shows the bolt 58'' connecting the two angle plates 57'', 57'' with the lever or plate 48'' journaled on a bushing or ring 60 mounted on the outside of one of the plates 57. The bushing 60 is longer than the thickness of the plate 48'' which will permit tension to be applied on the plates 57'', 57'' by the bolt 58'' without preventing the free movement of the lever 48''. After the nut is adjusted on the bolt the end of the latter may be peaned over adjacent the nut to prevent the latter from coming off.

A modification of the stabilizer is shown in Fig. 5 wherein the top roller of the stabilizer 49'' is replaced by a bolt 61. In this construction sliding engagement exists between the bolt 61 and the upper surface of the top leaf of the spring 38. Otherwise the construction of the device in Fig. 5 is the same as that described in connection with Figs. 3 and 4, in that it includes the parts 51'', 52'', 53'', 56'', 57'', 58'' connected by the link 48'' to the bolt 43.

Obviously those skilled in the art may make various changes in the details and arrangement of parts without departing from the spirit and scope of the invention defined by the claims hereto appended, and it is therefore desired not to be restricted to the precise construction herein disclosed.

Having thus fully described and shown an embodiment of the invention, what is desired to be secured by Letters Patent of the United States is:

1. A stabilizer for vehicle leaf springs comprising means for engaging at spaced-apart points one side of a vehicle leaf spring, means for engaging at an intermediate point the other side of such vehicle leaf spring while the leaves of the latter remain in contact with each other throughout their lengths, and mechanism independent of the frictional engagement of said engaging means with the spring for holding said engaging means spaced from the end of the vehicle leaf spring with which it is associated.

2. A stabilizer for vehicle leaf springs comprising a frame adapted to embrace the leaf spring, means connected to a pre-formed retaining means on said spring for engaging at spaced-apart points the lower side of the spring, and means intermediate the ends of said frame for engaging the upper side of the spring while all of the leaves of the spring remain in frictional contact with each other.

3. A stabilizer for vehicle springs comprising a three-point clamp associated with an end portion of the vehicle spring, two points of engagement with the spring being spaced apart at one side thereof and the third point of engagement being at the other side of the spring intermediate the ends of the clamp, and means independent of the frictional effect of said engaging means on said spring for retaining the clamp in predetermined relation to said spring.

4. The combination with a vehicle frame and spring therefor, of a pair of connected plates associated with said spring, and means between said plates in position to engage at all times the lower and upper sides of said spring.

5. The combination with a vehicle frame, of a leaf spring therefor, a shock absorber associated with an end portion of said spring having portions engaging the upper and lower surfaces thereof for sole support thereby independently of said frame, and means independent of the frictional contact of said engaging portions with said spring for maintaining said shock absorber in predetermined relation to said spring.

6. The combination with a vehicle spring, of means supported solely by said spring to automatically vary the effective length thereof to resist severe shock, and mechanism independent of the friction exerted between said shock absorber and spring for maintaining said means in predetermined relation to said spring.

7. The combination with a vehicle spring, of a leaf spring therefor, a stabilizer embracing said spring for sole support thereby independently of said frame and for operation solely by flexure of said spring to shorten the effective length of the latter when said spring is subjected to severe shock and to thereby reduce recoil from such shock, and means for preventing movement of the stabilizer longitudinally of the spring from its predetermined position in association with said spring and for automatically locating the position said stabilizer should occupy along said spring.

8. The combination with a vehicle spring, of a spring strengthener mounted near the end of said spring and having pivotal engagement at the bottom of said spring at a point remote from the end thereof, means having rolling engagement with the upper surface of said spring intermediate the ends of said strengthener, and means at the other end of said strengthener having rolling engagement with the lower surface of said spring near the end thereof.

9. The combination with a vehicle spring, of shock absorbing mechanism comprising a pair of connected side plates, pairs of roller bearings connected to said plates, and rollers in said bearings in position to engage the upper and lower surfaces of said spring.

10. Shock absorbing mechanism for vehicle leaf springs, comprising a frame having spaced-apart abutments positively connected thereto for engaging the lower side of the spring and an intermediate abutment for at the same time engaging the upper side of the spring, and means for maintaining said shock absorbing mechanism spaced from the end of the spring and against movement along the latter while supported solely by said spring with said abutments always in contact therewith.

11. In shock absorbers, the combination with a vehicle spring, of means mounted on said spring for sole support thereby and adapted to loosely engage the upper and lower surfaces thereof at spaced-apart points when the spring is in normal position and acting to exert a clamping effect on the spring for distributing severe shock to the more rigid portions of the spring.

12. The combination of a vehicle leaf spring normally occupying a curved position at one of its end portions, and a stabilizer associated with such curved portion of said spring and comprising spaced-apart abutments on one side of said spring and an intermediate abutment on the other side thereof, said abutments being normally in loose contact with the spring under normal load and being automatically tightened against the spring increasing the frictional engagement between the leaves of the spring when it tends to straighten out under abnormal load.

13. The combination of a vehicle leaf spring the leaves of which always remain in frictional engagement with each other, and a double elbow clamp closely fitting the spring when in normal position and comprising spaced-apart abutments on one side of said spring and an intermediate abutment on the other side of said spring, said abutments always being in engagement with the spring without normally exerting a substantial clamping pressure thereon and exerting increased pressure thereon automatically to increase the friction between the adjacent leaves when the spring is bent from its normal position by abnormal loads.

14. The combination with a vehicle leaf spring, of a shock absorber comprising a rigid frame adapted to embrace said spring at the end portion thereof, spaced-apart abutments associated with said frame on one side of said spring, an intermediate abutment associated with said frame on the other side of said spring, said abutments being so related to said frame and said spring as to afford continuous contact of said abutments with said spring when the latter is under normal load without exerting a substantial clamping pressure thereon and acting to automatically clamp the leaves of the spring together in proportion to abnormal increases in load, and means for retaining the said shock absorber associated with said spring near the end thereof.

15. The combination with a vehicle leaf spring, of a frame having spaced-apart arms each with an elbow intermediate its ends, an abutment between the elbows of said arms and located at one side of said spring, abutments at the ends of said arms located at the other side of said spring, and means connected to a pre-formed eyelet on said spring for retaining said frame together with its abutments near the end of said spring.

16. The combination with a vehicle frame, of a leaf spring connected thereto, a shock absorber comprising an automatic clamp for the spring spaced from the said frame and acting to increase the frictional engagement between the leaves of the spring to absorb shocks while said leaves all remain in frictional engagement with each other, and means for holding said shock absorber spaced a predetermined distance from said frame while associated with an end portion of said spring.

17. The combination with a vehicle leaf spring, of a shock absorber mounted near one end of said spring and having pivotal engagement with one of the leaves of said leaf spring, an abutment intermediate the ends of said shock absorber and in engagement with one side of said spring, and another abutment at that end of said shock absorber remote from said point of pivotal engagement, said last-named abutment being in engagement with the other side of said spring.

18. Shock absorbing mechanism adapted to be connected to the leaf spring of a vehicle, comprising a pair of side members connected together by separate means to form a rigid frame adapted to embrace such leaf spring, and three abutments for said frame, one intermediate the ends thereof to serve as the only abutment on one surface of the spring, and the other two abutments at the ends of the spring to serve as the only abutments on the other side of the spring.

19. In a shock absorber for vehicles, the combination with a rigid frame having side members, of three roller abutments one intermediate the ends of said frame in position to engage one side of a vehicle spring and the other two respectively at the ends of said frame in position to engage the other side of said spring, and means for holding said frame and said roller abutments spaced from the end of the spring.

20. The combination of a vehicle frame, an axle, a leaf spring supporting said frame upon said axle, and a stabilizer for said spring secured adjacent to but spaced from an end thereof and supported thereon independently of said frame and axle in position to compress a plurality of leaves of the spring together with an increasing force upon flexure of the spring, said stabilizer having a pair of contact bearings engaging one side of the spring at longitudinally spaced points a single contact bearing engaging the opposite side of the spring and located at a point longitudinally intermediate the spaced points, and means for pivotally connecting said stabilizer to a fixed part of said spring.

21. A stabilizer for vehicle leaf springs comprising a pair of contact bearings engaging the convex side of the spring at longitudinally spaced points a single contact bearing engaging the concave side of the spring and located at a point longitudinally intermediate the spaced points to place the spring leaves between the contact bearings under a predetermined pressure when the spring is in normal position, and means for holding said stabilizer in fixed position on said spring comprising a pin passing through a curled end portion on one of the leaves of said spring and operatively connected to said stabilizer.

22. A stabilizer for a vehicle leaf spring comprising a rigid non-flexible structure associated with an end portion of a leaf spring and comprising spaced-apart abutments on one side of said structure to engage one side of said leaf spring and an intermediate abutment on the other side of said structure to engage the other side of said leaf spring, a connection between said structure and said leaf spring to cause said abutments to increase the clamping effect on the spring when the latter is moved out of its normal position, and spacing means for spacing the stabilizer a predetermined distance from the end of said spring independently of the clamping effect which the abutments have on the spring.

23. A stabilizer for vehicle springs, comprising means for engaging one side of a vehicle spring at spaced-apart points, means at intermediate points for engaging the other side of the spring, mechanism for retaining said means in fixed relation to said spring so as to increase the clamping effect on the spring when the latter is moved out of its normal position, said retaining mechanism being operative independently of the clamping effect.

24. Shock absorbing mechanism for vehicle springs, comprising spaced-apart abutments for engaging the lower surface of a spring, an intermediate abutment for engaging the upper surface of a spring, and means for retaining said abutments in predetermined relation to said spring to increase the clamping effect on the spring when the latter is moved out of its normal position, said retaining means being operative independently of the clamping effect.

In testimony whereof I have signed my name to this specification on this 23rd day of February, A. D. 1925.

EARNEST R. SNOOK.